US011068484B2

(12) United States Patent
Kirk et al.

(10) Patent No.: US 11,068,484 B2
(45) Date of Patent: Jul. 20, 2021

(54) ACCELERATING QUERIES WITH COMPLEX CONDITIONS USING ZONE MAP ENHANCEMENTS

(71) Applicant: SAP SE, Walldorf (DE)

(72) Inventors: Steven Kirk, Chelmsford, MA (US); Roland McKenney, Billerica, MA (US)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 16/395,586

(22) Filed: Apr. 26, 2019

(65) Prior Publication Data

US 2020/0341983 A1 Oct. 29, 2020

(51) Int. Cl.
*G06F 16/00* (2019.01)
*G06F 16/2453* (2019.01)
*G06F 16/22* (2019.01)

(52) U.S. Cl.
CPC .... *G06F 16/24549* (2019.01); *G06F 16/2255* (2019.01); *G06F 16/2282* (2019.01)

(58) Field of Classification Search
CPC ........... G06F 16/24549; G06F 16/2255; G06F 16/2282
See application file for complete search history.

(56) References Cited

U.S. PATENT DOCUMENTS 9,569,490 B1 * 2/2017 Kalarikal Janardhana .................. G06F 16/244
10,838,963 B2 * 11/2020 Brodt ...................... G06F 16/22
2015/0286682 A1 * 10/2015 Ziauddin ............. G06F 16/2282 707/718
2016/0188623 A1 * 6/2016 Finlay ................. G06F 16/2255 707/690
2017/0270161 A1 * 9/2017 Brodt ................ G06F 16/24545
2017/0293657 A1 * 10/2017 Kirk .................. G06F 16/24549
2017/0322962 A1 * 11/2017 Boehme .............. G06F 16/2282
2018/0018098 A1 * 1/2018 Burugula .............. G06F 3/0664
2019/0005096 A1 * 1/2019 Ziauddin ................. G06F 16/23

OTHER PUBLICATIONS

Ziauddin, M. et al., "Dimensions Based Data Clustering and Zone Maps," *Proceedings of the VLDB Endowment*, vol. 10, No. 12, pp. 1622-1633 (2017).

* cited by examiner

*Primary Examiner* — Alexander Khong
(74) *Attorney, Agent, or Firm* — Sterne, Kessler, Goldstein & Fox P.L.L.C.

(57) ABSTRACT

Disclosed herein are system, method, and computer program product embodiments for accelerating queries with zone map enhancements. An embodiment operates by receiving a query including a condition on one or more values from a column of a database table. It is determined that the values from the column are divided into a plurality of data zones, and that a sorted dictionary includes an ordered arrangement of the values from the column. A min value and a max value from a satisfaction array that indicates which values satisfy the condition are determined. Which of the data zones are disqualified are determined based on the values of the disqualified data zone falls outside of the range between the minimum value and the maximum value. The values of any remaining zones are evaluated to determine a result of the query. The result set is returned.

14 Claims, 14 Drawing Sheets

200

ZONE MAP
FOR COLUMN T.X 114A 116A 116B

| ZONE ID | MIN T.X | MAX T.X |
|---|---|---|
| 1 | 1 | 3 |
| 2 | 2 | 5 |
| 3 | 3 | 6 |
| 4 | 1 | 7 |
| 5 | 5 | 8 |
| 6 | 5 | 9 |
| 7 | 7 | 8 |
| 8 | 6 | 11 |

| ZONE ID | SET OF T.X CELL VALUES | |
|---|---|---|
| 1 | 1, 2, 3, 1, 2, 1, 1, 3, 1, 2, 2, 3 | 112A |
| 2 | 2, 4, 3, 5, 3, 2, 4, 5, 3, 2, 2, 2 | 112B |
| 3 | 3, 5, 4, 4, 3, 6, 5, 3, 5, 6, 4, 4 | 112C |
| 4 | 3, 5, 6, 7, 6, 7, 7, 4, 1, 3, 4, 6 | 112D |
| 5 | 5, 6, 5, 8, 7, 5, 7, 5, 6, 6, 7, 8 | 112E |
| 6 | 7, 8, 5, 6, 5, 8, 7, 9, 7, 6, 8, 7 | 112F |
| 7 | 8, 8, 7, 7, 8, 8, 8, 8, 7, 9, 8, 9 | 112G |
| 8 | 9, 8, 9, 9, 6, 8, 9, 10, 11, 9, 10 | 112H |

ZONE DICTIONARY FOR COLUMN T.X

114

116C

| ZONE ID | T.X ZONE DICTIONARY |
|---|---|
| 1 | 1, 2, 3 |
| 2 | 2, 3, 4, 5 |
| 3 | 3, 4, 5, 6 |
| 4 | 1, 3, 5, 6, 7 |
| 5 | 5, 6, 7, 8 |
| 6 | 5, 6, 7, 8, 9 |
| 7 | 7, 8, 9 |
| 8 | 6, 8, 9, 10, 11 |

| ZONE ID | SET OF T.X CELL VALUES | |
|---|---|---|
| 1 | 1, 2, 3, 1, 2, 1, 1, 3, 1, 2, 2, 3 | 112I |
| 2 | 2, 4, 3, 5, 3, 2, 4, 5, 3, 2, 2, 2 | 112J |
| 3 | 3, 5, 4, 4, 3, 6, 5, 3, 5, 6, 4, 4 | 112K |
| 4 | 3, 5, 6, 7, 6, 7, 7, 4, 1, 3, 4, 6 | 112L |
| 5 | 5, 6, 5, 8, 7, 5, 7, 5, 6, 6, 7, 8 | 112M |
| 6 | 7, 8, 5, 6, 5, 8, 7, 9, 7, 6, 8, 7 | 112N |
| 7 | 8, 8, 7, 7, 8, 8, 8, 8, 7, 9, 8, 9 | 112O |
| 8 | 9, 8, 9, 9, 6, 8, 9, 10, 11, 9, 10 | 112P |

FIG. 5

814 ZONE MAP FOR "T. ORDERDATE"

| ZONE ID (812) | T. ORDERDATE MIN (816A) | T. ORDERDATE MAX (816B) |
|---|---|---|
| 1 | 2018/11/06 | 2018/11/08 |
| 2 | 2018/11/08 | 2018/11/10 |
| 3 | 2018/11/11 | 2018/11/13 |
| 4 | 2018/11/13 | 2018/11/14 |
| 5 | 2018/11/16 | 2018/11/18 |
| 6 | 2018/11/19 | 2018/11/23 |
| 7 | 2018/11/24 | 2018/11/24 |
| 8 | 2018/11/24 | 2018/11/27 |

| ZONE ID (812) | SET OF T. ORDERDATE CELL VALUES (820) |
|---|---|
| 1 | 2018/11/06, 2018/11/07, 2018/11/08, 2018/11/08, 2018/11/08 |
| 2 | 2018/11/08, 2018/11/09, 2018/11/09, 2018/11/10, 2018/11/10, 2018/11/10 |
| 3 | 2018/11/11, 2018/11/12, 2018/11/12, 2018/11/12, 2018/11/13, 2018/11/13 |
| 4 | 2018/11/13, 2018/11/14, 2018/11/14, 2018/11/14, 2018/11/14, 2018/11/14 |
| 5 | 2018/11/16, 2018/11/16, 2018/11/17, 2018/11/17, 2018/11/18 |
| 6 | 2018/11/19, 2018/11/19, 2018/11/20, 2018/11/21, 2018/11/22, 2018/11/23 |
| 7 | 2018/11/24, 2018/11/24, 2018/11/24, 2018/11/24 |
| 8 | 2018/11/24, 2018/11/26, 2018/11/26, 2018/11/26, 2018/11/27 |

FIG. 8

902 Sorted Dictionary

| ORDINAL | ORDERED DISTINCT T. ORDERDATE CELL VALUES |
|---|---|
| 1 | 2018/11/06 |
| 2 | 2018/11/07 |
| 3 | 2018/11/08 |
| 4 | 2018/11/09 |
| 5 | 2018/11/10 |
| 6 | 2018/11/11 |
| 7 | 2018/11/12 |
| 8 | 2018/11/13 |
| 9 | 2018/11/14 |
| 10 | 2018/11/16 |
| 11 | 2018/11/17 |
| 12 | 2018/11/18 |
| 13 | 2018/11/19 |
| 14 | 2018/11/20 |
| 15 | 2018/11/21 |
| 16 | 2018/11/22 |
| 17 | 2018/11/23 |
| 18 | 2018/11/24 |
| 19 | 2018/11/26 |
| 20 | 2018/11/27 |

FIG. 9

FOR CONDITION:
DAYNAME (T. ORDERDATE) = 'Saturday'
OR DAYNAME (T. ORDERDATE) = 'Sunday'

902 Sorted Dictionary

1002

1102

| ORDINAL | ORDERED DISTINCT T. ORDERDATE CELL VALUES | SATISFACTION ARRAY | CUMULATIVE SATISFACTION ARRAY |
|---|---|---|---|
| 0 | | | 0 |
| 1 | 2018/11/06 | 0 | 0 |
| 2 | 2018/11/07 | 0 | 0 |
| 3 | 2018/11/08 | 0 | 0 |
| 4 | 2018/11/09 | 0 | 0 |
| 5 | 2018/11/10 | 1 | 1 |
| 6 | 2018/11/11 | 1 | 2 |
| 7 | 2018/11/12 | 0 | 2 |
| 8 | 2018/11/13 | 0 | 2 |
| 9 | 2018/11/14 | 0 | 2 |
| 10 | 2018/11/16 | 0 | 2 |
| 11 | 2018/11/17 | 1 | 3 |
| 12 | 2018/11/18 | 1 | 4 |
| 13 | 2018/11/19 | 0 | 4 |
| 14 | 2018/11/20 | 0 | 4 |
| 15 | 2018/11/21 | 0 | 4 |
| 16 | 2018/11/22 | 0 | 4 |
| 17 | 2018/11/23 | 0 | 4 |
| 18 | 2018/11/24 | 1 | 5 |
| 19 | 2018/11/26 | 0 | 5 |
| 20 | 2018/11/27 | 0 | 5 |

FIG. 11

CUMULATIVE SATISFACTION
HAS TABLE FOR CONDITION:
DAYNAME (T. ORDERDATE) = 'Saturday'
OR DAYNAME (T. ORDERDATE) = 'Sunday'

1202

| HASH BUCKET | | | | | |
|---|---|---|---|---|---|
| 1 | 2018/11/16 | 2, 2 | | | |
| 2 | | | | | |
| 3 | 2018/11/24 | 4, 5 | | | |
| 4 | 2018/11/09 | 0, 0 | → | 2018/11/23 | 4, 4 |
| 5 | 2018/11/10 | 0, 1 | | | |
| 6 | | | | | |
| 7 | 2018/11/18 | 3, 4 | | | |
| 8 | | | | | |
| 9 | 2018/11/14 | 2, 2 | | | |
| 10 | | | | | |
| 11 | 2018/11/17 | 2, 3 | | | |
| 12 | 2018/11/27 | 5, 5 | | | |
| 13 | 2018/11/19 | 4, 4 | | | |
| 14 | | | | | |
| 15 | 2018/11/07 | 0, 0 | | | |
| 16 | 2018/11/22 | 4, 4 | → | 2018/11/11 | 1, 2 |
| 17 | | | | | |
| 18 | 2018/11/13 | 2, 2 | | | |
| 19 | 2018/11/26 | 5, 5 | | | |
| 20 | | | | | |
| 21 | 2018/11/21 | 4, 4 | | | |
| 22 | 2018/11/08 | 0, 0 | | | |
| 23 | | | | | |
| 24 | 2018/11/12 | 2, 2 | | | |
| 25 | 2018/11/06 | 0, 0 | → | 2018/11/20 | 4, 4 |
| 26 | | | | | |

HASH RECORD:
 KEY: T. ORDERDATE
 VALUES: PRIOR CUMULATIVE SATISFACTION, CURRENT CUMULATIVE SATISFACTION

CUMULATIVE SATISFACTION
AND DISTINCT ORDINAL
HAS TABLE FOR CONDITION:
DAYNAME (T. ORDERDATE) = 'Saturday'
OR DAYNAME (T. ORDERDATE) = 'Sunday'

HASH RECORD:
KEY: T. ORDERDATE
VALUES: PRIOR CUMULATIVE SATISFACTION, CURRENT CUMULATIVE SATISFACTION

ACCELERATING QUERIES WITH COMPLEX CONDITIONS USING ZONE MAP ENHANCEMENTS

CROSS-REFERENCE TO RELATED APPLICATIONS

The application is related to U.S. patent application Ser. No. 15/096,736 titled "Accelerating Queries With Zone Map Enhancements," filed on Apr. 12, 2016, which is herein incorporated by reference in its entirety.

BACKGROUND

Database systems are designed not only to store data, but also to provide users of a database system with queried data from the database as quickly as possible. Generally, a user submits a query with a set of conditions, and the database system compares the data against the conditions of the query and returns whatever data from the database that satisfies the conditions. However, how the database system evaluates and processes the various conditions has a tremendous impact on how quickly the data is retrieved and returned to the user.

BRIEF DESCRIPTION OF THE DRAWINGS

The accompanying drawings are incorporated herein and form a part of the specification.

FIG. 2 is a block diagram of an example zone map, according to some embodiments.

FIG. 5 is a block diagram of an example zone dictionary, according to some embodiments.

FIG. 8 illustrates example zone maps and a corresponding data zone structure for values of a selected column from a database table, according to some embodiments.

FIG. 9 illustrates an example data dictionary that has been sorted into a sorted dictionary, according to some embodiments.

FIG. 11 illustrates a cumulative satisfaction array for processing queries, according to some example embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for accelerating queries with complex conditions using zone map enhancements.

Figure 1:
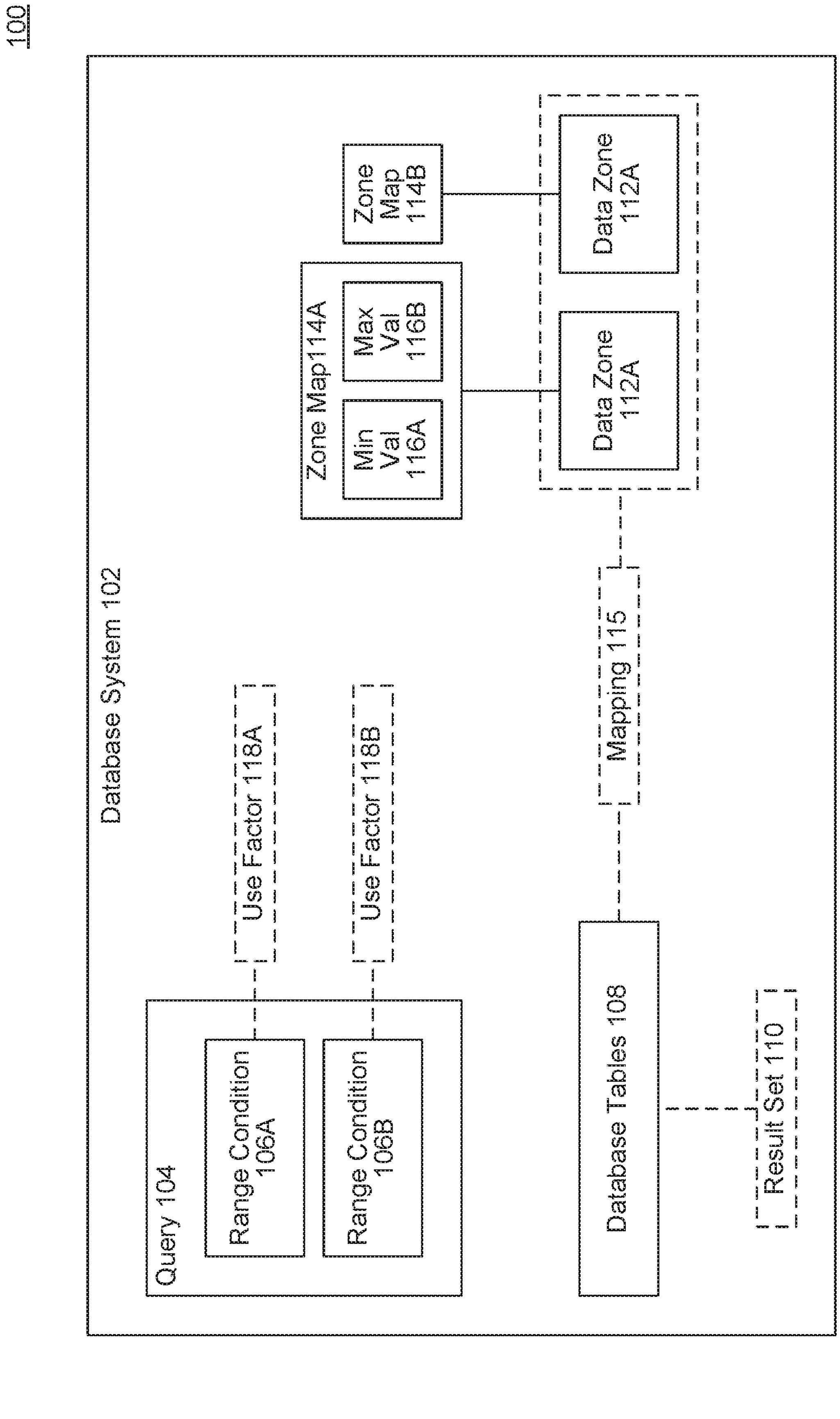
FIG. 1 is a block diagram of a database system that accelerates queries with zone map enhancements, according to some embodiments.

FIG. 1 is a block diagram 100 of a database system 102 that accelerates queries with zone map enhancements, according to an example embodiment. Database system 102 may receive a query 104 with conditions 106. Database system 102 may process the conditions 106 against the data of one or more database tables 108 and return a result set 110. Result set 110 may include any data of database system 102 that satisfies the conditions 106 of query 104, and if no data satisfies query 104, result set 110 may be an empty or null set. Zone maps 114 and/or use factors 118 may accelerate, enhance, optimize or otherwise improve the processing of query 104 and the evaluation of conditions 106 by database system 102 so as to use less time, CPU cycles, and/or other resources than would otherwise be required to identify and/or return whatever result set data 110 that satisfies query 104.

Database tables 108 may include data stored across one or more tables of either a row-oriented and/or column-oriented database. Many of the example embodiments provided herein are directed to column-oriented databases, however it is understood that the teachings may also apply to row-oriented database embodiments and combinations of column- and row-oriented databases as well. The data of database tables 108 may physically be stored across one or more data or memory pages that may be organized into data zones 112 and may be stored across multiple different computers or processors.

A data zone 112 may be one or more memory pages including data of database tables 108. The data of a particular data zone 112 may be related, associated, or similarly organized in some manner. For example, in a column-oriented database embodiment, a first data zone 112A may include data from a first column of a column-oriented database, while a second data zone 112B includes data from a second column. In other embodiments, data zones 112 may include rows of data across multiple columns, including a partial row across a subset of columns. However, each of the rows in a particular data zone 112 (or across a subset of multiple related data zones 112) includes data across the same columns.

In an embodiment, each data zone 112 may include its own mapping 115 to database tables 108. Mapping 115 may include an association or correspondence between the data as organized in a data zone 112 and the corresponding data as it is stored in rows/columns of database tables 108. In an embodiment, mapping 115 may include an address, data identifier, or pointer relating an entry in database table 108 and an entry in data zone 112.

As noted above, a first data zone 112A may include data corresponding to a first column of database tables 108, while a second data zone 112E corresponds to a second column. However, in an embodiment, the first column may include data values that are only two bit integers, while the second column may include large strings that include upwards of 20 characters. As such, data zone 112A may be organized differently than data zone 112B (which may due in part to the variance in the storage requirements of different values), and as such each data zone may include its own mapping 115 back to the corresponding rows/columns of database tables 108. In an embodiment, a single column (or selected subset of columns) of database tables 108 may be spread across multiple related data zones 112.

Each data zone 112 may have a corresponding zone map 114 that includes metadata 116 that indicates features of the respective data zone 112. Zone map 114 may be an index or a set of metadata associated with the data or values of a data zone 112 that provides data 116 that may be used to process one or more conditions 106 of query 104. The metadata 116 of zone map 114 may include a data dictionary including the unique values stored within a data zone, date/time values, min and max string length for a variable width string column, or other metadata values about the data of a particular data zone 112. Then, for example, conditions 106 of query may be any conditions 106 (including but not limited to range conditions 106A and 106B as shown) that may be compared against the stored metadata of a zone map 114 to classify the zones as guaranteed, border, or disqualified zones, such as equality conditions, STRLEN range conditions, LIKE conditions, DATEPART conditions (e.g., for date type column values), or other conditions.

In an embodiment, the metadata 116 may indicate a range of values that are stored within the zone map in the example of FIG. 1, zone map 114A includes two data values 116; minimum value 116A and maximum value 116B of the column within that zone. The values 116 may correspond to the range (minimum and maximum) of data (values) that are stored in a data zone 112. In an embodiment, different zone maps 114 may include different metadata 116 for different data zones 112, which may depend in part on the nature of the data. For example, zone map 114B may include metadata different from zone map 114A. In an embodiment, a zone map 114 may include metadata or data zone values 116 for multiple related data zones 112 (e.g., data zones 112 with a similar structure and/or data type). Though the example shown in FIG. 1, and described primarily herein, is associated with range conditions 106A, 106B relative to minimum and maximum data values 116A, 116B, as noted above other embodiments may include other metadata 116 and relative conditions 106 as well. An example of a zone dictionary (metadata 116) is shown in FIG. 5.

Zone maps 114 may be used to determine which data zones 112 do include or may include values corresponding to one or more range conditions 106A of query 104. Zone maps 114 may also be used to determine which data zones 112 do not or cannot include values that satisfy query 104 (e.g., because the values as indicated by metadata 116 fall outside the specified range condition 106A). Database system 102 may use the metadata 116 stored or maintained in zone maps 114 to quickly evaluate the data of a particular data zone 112 without the need to read or access every record or value of each data zone 112, which may speed up query processing. In an embodiment, zone maps 114 may be stored and accessed separately from the data stored in data zones 112. For example, the data of data zones 112 may be stored on a hard disk, while the metadata 116 may be stored in a faster-access memory location.

As noted above, query 104 may include one or more range conditions 106A. A range condition 106A may be any condition that may be evaluated, at least in part, by the metadata 116 of zone maps 114. For example, range condition 106A may be a condition that the data is greater than a value, less than a value, greater than or equal to a value, less than or equal to a value, bounded between two values, or does not include a subset of values, etc. (including any combination thereof). Using the metadata 116 of zone maps 114, database system 102 may determine which data zones 112 include data that satisfy the condition 106A, don't satisfy the condition 106A, or may satisfy the condition 106A.

FIG. 2 is a block diagram 200 of an example zone map 114, according to an example embodiment. A particular column of a database table 108 may include the values shown in the various data zones 112. In the embodiment shown, the values of database table 108 may be stored across eight different data zones 112A-H. Each data zone 112 may include metadata 116A and 116B in zone map 114. In an embodiment, because the data of data zones 112 correspond to the same column of database table 108, the various zones 112 may share a mapping 115 to the column and/or table 108. However, in another embodiment, each data zone 112 may include its own mapping 115.

In different embodiments, zone map 114 may be spread across different data structures, or may be combined into a single data structure 114 (as shown). In the example shown, the zone map 114 includes/maintains minimum values 116A and maximum values 116B for each data zone 112. As noted above, values 116 of zone map 114 may be accessible without individually accessing the values of each data zone 112 or corresponding data/records of database tables 108.

In an embodiment, the min vals 116A and max vals 116B (or any other metadata values 116) may be maintained as the data is added, removed, or otherwise modified in database tables 108 (and/or correspondingly data zones 112). For example, data may be added/modified or removed from database tables 108 by different write operations that are ongoing or pending in database system 102. Database system 102 may track which data is added and/or removed from tables 108, and update values 116 accordingly. For example, each time data is added, removed, or otherwise modified from database tables 108, database system 102 may compare the modification (i.e., new/modified/removed data) to the corresponding zone map values 116 for the respective data zone 114. If the modification has changed any of the zone map values 116 (e.g., the minimum or maximum value 116 has changed), database system 102 may update the corresponding zone map 114. While comparing every modification of data to the zone map values 116 results in having exact values 116 for query processing, maintaining the zone maps 114 in such a manner requires additional resources relative to maintaining the zone maps 114 in a manner in which not every modification of data is compared.

In another embodiment, in order to reduce the maintenance cost (e.g., the resources required to maintain zone map 114), database system 102 may only compare new/modified data values added to a data zone 112 to zone map values 116. This may eliminate the cost (time/CPU cycles) necessary to compare the data of data zones 112 to the zone map values 116 when data is deleted or removed from data zones 112. This may have the result of zone map values 116 including the extremes of what data was included in a particular data zone 112 (at some point in time), with the caveat that the zone map values 116 may not be 100% accurate, as it is possible one of those extreme values was removed/deleted at some point but never necessarily updated. This may improve the speed/efficiency of overall data and query processing, thus resulting in zone map data 116 that is correct, but not exact in that all of the data of a data zone 112 still falls within the min/max range 116, but may not extend to the extremes of the range. The net result would be faster query and data processing that still yields correct results 110.

As noted above, a query 104 may be received with one or more conditions 106, including at least one range condition 106A. A database table 108 may have been divided into a set of disjoint subsets referred to as data zones 112. In an embodiment, each data zone 112 may include values for a selected column of the table 108, or for example, a single column may have its values spread across multiple data zones 112. In other embodiments, each data zone 112 may include row values, or sets of columns. A set of metadata 116 may be tracked for the values in each zone in a zone map 114, such as min val 116A and max val 116B. Zone maps 114 may be evaluated based on the range condition 106A to classify (or identify) the zones as qualified zones that may contain values to satisfy range condition 106A, and disqualified zones that include values or data that cannot satisfy the selected range condition 106A.

In the example of FIG. 2, the min value 116A and max value 116B for zone 1 are 1 and 3, and the min and max values for zone 2 are 2 and 5, respectively, as shown in zone map 114. These min and max values 116 are maintained in the corresponding zone map 114 in the manner described above as data of database table 108 is modified.

As an example in which zone map 114 is used to process query 104, range condition 106A may specify that "T.X=2." Based on zone map 114, database system 102 may classify the zones finding that the qualified zones are {1, 2, 4} and the disqualified zones are {3, 5, 6, 7, 8}, A qualified zone may be a zone containing rows where the specified range condition 106A may be satisfied by at least some of the values of the data zone 112. A disqualified zone, by contrast, are those data zones 112 in which the range condition cannot be satisfied by any column values of the table. In another example, range condition 106A may be "T.X>6." Applying this criteria, the qualified zones are {4, 5, 6, 7, 8} and the disqualified zones are {1, 2, 3}.

Database system 102 may further enhance or accelerate query processing by further classifying, within the qualified zones, guaranteed zones and border zones. A guaranteed zone is a zone 112 in which all of the records or values meet or satisfy the specified range condition 106A. A border zone, by contrast, is a zone 112 in which some of the records or values may meet the specified range condition 106A, and some values may not. As such, when a guaranteed zone is identified for a range condition 106A, each value or record of the data 112 does not need to be checked. Meanwhile, for a border or candidate zone, database system 102 may process the different values within the data zone 112 to determine which records satisfy or do not satisfy the range condition 106A. In an embodiment, there may be a border zone in which all of the records or values meet or satisfy the range condition 106A.

In the first example provided earlier, range condition 106A specifies that "T.X=2." Based on zone map 114, zones {1, 2, 4} may be border zones, while zones {3, 5, 6, 7, 8} may be disqualified zones, and no zones may be guaranteed zones. In the second example, range condition 106A is "T.X>6." Database system 102 may classify {1, 2, 3} as being disqualified zones, {4, 5, 6, 8} as being border zones, and {7} as being a guaranteed zone.

Classifying the disqualified zones allows database system 102 to skip evaluating the correspondingly disqualified records when processing the range condition 106A and any other remaining conditions 106A or 106B. Similarly, classifying a guaranteed zone allows database system 102 to skip evaluating each record of the zone against the current range condition 106A. For example, since zone 7 is guaranteed, database system 102 does not process every record or value of zone 7 to identify or confirm which specific records meet the range condition 106A. All of the records of zone 7 are identified as satisfying the range condition 106A. This may save processing resources and/or time. Database system 102 also does not need to process any of the disqualified zones, since it is known that none of those records satisfy the range condition 106A. Database system 102 may then process the values or records of the border zones to identify which records satisfy the range condition 106A.

The intermediate resulting set of records that satisfy range condition 106A would be each of the records in the guaranteed zone(s) (if any), and the individually identified records of the border zone(s). Database system 102 may then use this intermediate resulting set to process any remaining conditions 106 (range conditions 106A and/or local conditions 106B) of query 104. Processing the remaining conditions 106 against only a subset of identified data may increase the speed at which the remaining conditions 106 may be processed and the final result set 110 may be identified.

FIG. 5 is a block diagram 500 of another example zone map, according to an embodiment. Database system 102 may analyze a set of metadata (zone or data dictionary) 116 associated with each data zone 112, and classify the zones as being guaranteed zones, border zones, or disqualified zones. As shown, the metadata 116 analysis is not limited to only the zone map's minimum and maximum value metadata as described with reference to FIGS. 1 and 2

One example of another form of zone metadata is a dictionary 116C of the distinct values within the column for each zone. Zone dictionary 116C could be maintained instead of a zone map 114 (as described above with regard to other minimum and maximum values), in which case the dictionary 116C may also be the zone map, or in addition to such a zone map 114 including additional metadata. The example of FIG. 5 shows the zone dictionary 116C for the example T.X column. Zone dictionary 116C can provide the same capabilities as the zone map 114B, but in addition, it can be used to classify zones as guaranteed zones, border zones, and disqualified zones for any arbitrary type of condition on the column, unlike the zone map which may be used for range conditions (i.e. <, >, <=, <=, =, !=, and BETWEEN). Zone dictionary 114B may require additional space as the distinct value counts in the data zones increase, thereby increasing efficiency with regard to zones with a smaller number of distinct values even or for narrow data types.

For example, using the greater-than condition "T.X>6" earlier described, using zone dictionary 116C, database system 102 may evaluate each distinct value against the condition and can identify whether any or all of the distinct values within a specific zone satisfy the condition and therefore whether that zone is a guaranteed, border, or disqualified zone. A similar process, however can also be used for more complicated conditions including arithmetic expressions or functions such as "MOD(T.X, 5)=0" (which is an example of the modulus function). Applying that identification or classification criteria, database system 102 may classify the zones such that: the disqualified zones for that condition are {1, 7}, the border zones are {2, 3, 4, 5, 6, 8} and the set of guaranteed zones is empty.

Returning to FIG. 1, in an embodiment, database system 102 may use bitmaps to combine the effects of multiple conditions 106. The bitmaps may represent the incoming set of rows to be considered and the resulting set 110 of rows that satisfy the condition(s) 106. In the example of bitmaps, range condition 106A may be considered just another bitmap-based condition and is not necessarily processed first (as described above), but may be processed in a potentially more efficient manner or order as may be determined based on use factors 118. An example of such bitmap processing is described in U.S. Pat. No. 8,843,499 filed Dec. 29, 2010, which is hereby incorporated by reference in its entirety; it should be understood that this disclosure is not limited to that example.

As noted above, query 104 may include both range conditions 106A and local conditions 106B. Range conditions 106A may be any conditions that may be satisfied by values 116 stored in zone map 114. Local conditions 106B, by contrast, may be any conditions that may require access to data of data zones 112 because they are not determinable based on the metadata values 116 of zone map 114 alone. In an embodiment, the evaluation or processing of location conditions 106B may require access to the values or data of the different data zones 112. In determining the order in which to process conditions 106A and 106B, database system 102 may determine a corresponding use factor 118A and 118B for the various conditions 106.

Database system 102 may identify a more efficient way or order in which to process conditions 106 of query 104, other than by simply processing them in the order they are presented within query 104 (though in some embodiments, that may be determined to be the most efficient way and conditions 106 may be processed in the order presented), or by simply processing range conditions 106A prior to local conditions 106B. Database system 102 may compute a use factor 118 for the different conditions 106 of query 104. In calculating use factor 118, database system 102 may evaluate the available resources of database system 102 (e.g., available processors, current workload, maintained indexes of data) against the gain of processing a condition 106.

The relative value (or potential gain) of a condition 106 may be measured by the number or percentage of rows that would be eliminated (or conversely that would remain) through processing or evaluating the condition 106 against the data. The gain may be a factor of how many records or values remain or may be eliminated as a result of processing the condition 106; the fewer records that remain after processing, the faster the remaining processing may be performed (due to having fewer records to process), and thus the higher the gain.

In computing use factors 118, the gain may be factored against the cost of processing the conditions 106. The cost may be the CPU cycles, time, and/or resources necessary to process the condition and achieve the gain, for example. The higher the cost, the lower the use factor 118. For example, if database system 102 maintains an index relative to the data to be evaluated for a first condition 106 but does not maintain an index for the data to be evaluated relative to a second condition 106, then the cost of the second condition 106 may be greater than the first condition 106. Or, for example, if a first condition requires a series of arithmetic computations to be performed on a data value before an evaluation can occur, then the cost of that condition 106 may be higher than the cost of a second condition that does not require such computations.

In an embodiment, the use factor 118 may be a calculated value that accounts for the gain relative to the cost for the conditions 106 of query 104. Then, for example, database system 102 may evaluate or process those conditions 106 with the greatest use factor 118 (i.e., greatest gain relative to cost) prior to those conditions 106 with a lesser use factor 118 (i.e., greater cost relative to gain).

Returning to FIG. 2, query 104 may include the following conditions 106:

T.Customer=1634679; T.X BETWEEN 1 and 4; T.Status='Returned.' In using the zone map optimization (without the use factor 118), database system 102 may evaluate the range condition 106A first. In evaluating the range condition (i.e., the BETWEEN condition) against zone map 114, database system 102 may determine that {1} is a guaranteed zone, {2, 3, 4} are candidate or border zones, while {5, 6, 7, 8} are disqualified zones.

Database system 102 may then process the individual records of the candidate or border zones to determine which records of the zones satisfy the Between condition (and may satisfy query). As noted above, database system 102 may not perform any such record-by-record or value analysis on either the guaranteed zone(s) or the disqualified zones. In fact, the processing of any disqualified zones may be discontinued altogether since they fail to meet one of the necessary conditions 106 of the query 104; accordingly, they would necessarily fail to meet the remaining conditions 106 and fail to satisfy the query 104. An example of partition elimination is described in U.S. patent application Ser. No. 14/800,405 filed Jul. 15, 2015, which is hereby incorporated by reference in its entirety; however, this disclosure is not limited to that example. In an embodiment, the records of the guaranteed zone and the identified records of the candidate or border zones are processed against the remaining conditions 106. For example, the customer and status conditions may be evaluated against the records of the guaranteed zone and the identified records of the candidate zones that satisfy the between condition.

In an embodiment, database system 102 may further enhance processing by applying use factors 118 to the condition 106 processing. For example, if the customer condition is satisfied by 100 million rows while each zone has 1 million rows, then evaluating the customer condition after the zone condition (in the manner described above) would be more efficient than doing it the opposite way (i.e., the use factor 118A of the range condition 106A would be greater than the use factor 118B of the local condition 106B). However, if the customer condition is satisfied by only 100 rows (e.g., high gain) and there is an acceptable index of those rows (e.g., reducing the cost), while each zone has one million rows, then the customer condition should be evaluated before the zone condition (i.e., use factor 118B is greater than use factor 118A). In different embodiments and circumstances, the same conditions 106 may be processed in different orders depending on the nature of the data and the resources available in a database system 102.

Figure 3:
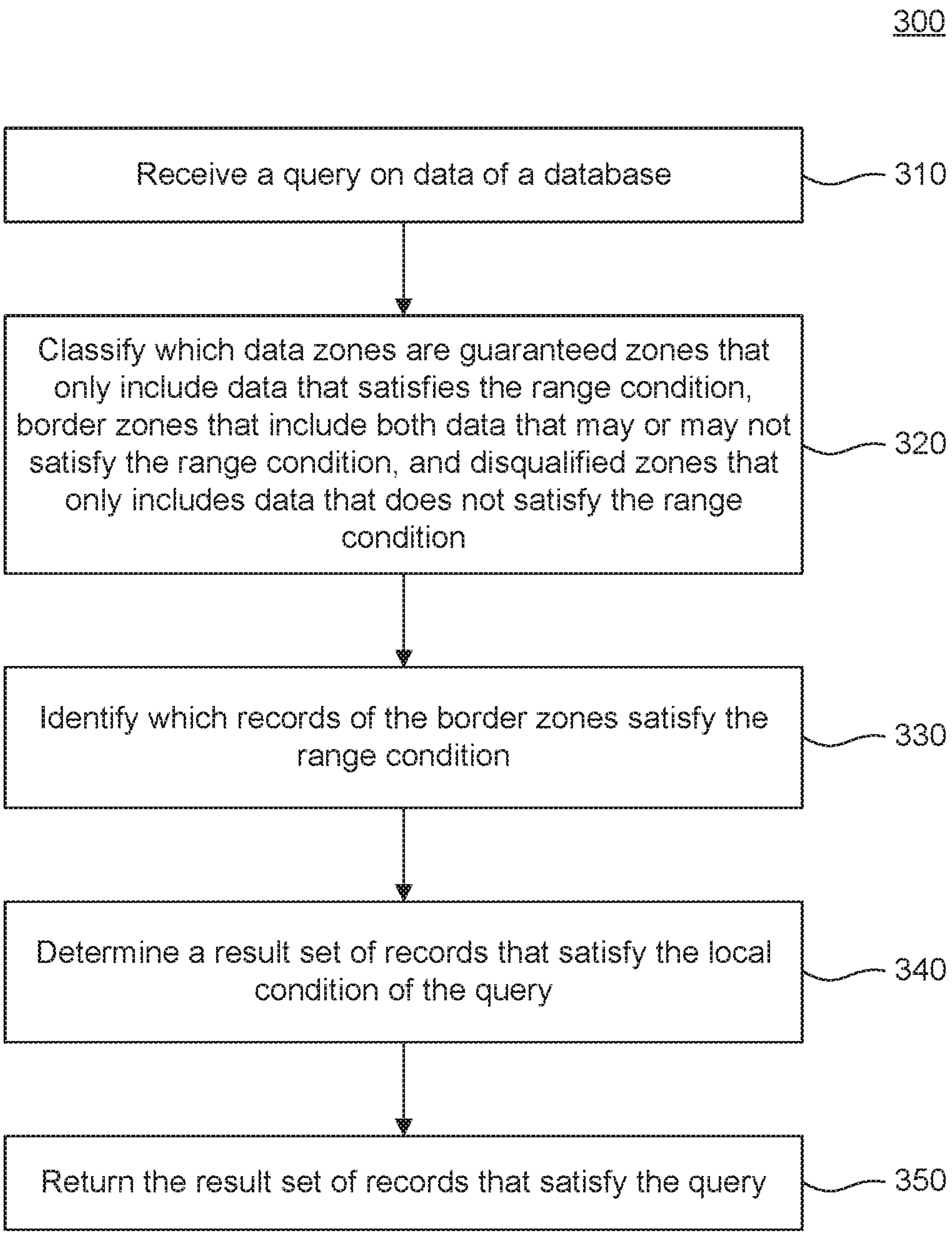
FIG. 3 is a flowchart illustrating a process for accelerating queries with zone map enhancements, according to some embodiments.

FIG. 3 is a flowchart illustrating a process for accelerating queries with zone map enhancements, according to an example embodiment. Method 300 can be performed by processing logic that can comprise hardware (e.g., circuitry, dedicated logic, programmable logic, microcode, etc.), software (e.g., instructions executing on a processing device), or a combination thereof.

In step 310, a query on data of a database is received. For example, database system 102 may receive query 104, including one or more range conditions 106A and one or more local conditions 106B. Query 104 may be received from a user or system. The data of database system 102 against which to process query 104 may be stored across one or more database tables 108. The data of the database tables 108 may further be organized or arranged into data zones 112.

In step 320, the database system identifies, amongst the data zones, which data zones are guaranteed zones that only include data that satisfies the range condition, border zones that include data that may or may not satisfy the range condition, and disqualified zones that only includes data that does not satisfy the range condition. For example, database system 102 may compare min val 116A and max val 116B against range condition 106A to determine or classify which data zones 112 are guaranteed zones, border zones, and disqualified zones. In an embodiment, zone map 114 may be stored in a memory or storage location that is easier or faster to access than the data stored in data zones 112, which may be on a disk or otherwise slower storage location.

In step 330, database system identifies which records of the border zones satisfy the range condition. For example, database system 102 may perform a value-by-value analysis on the records of any identified border zones to determine which particular records of the identified border data zone 112 meet or satisfy the criteria of range condition 106A.

In step 340, database system may determine a result set of records that satisfy the local condition of the query. For example, database system 102 may compare an intermediate set of records (including all the records of any guaranteed zones, and the particularly identified records of border zones) to one or more local conditions 106B of query 104. In an embodiment, database system 102 may process one or more local conditions 106B prior to processing the range condition(s) 106A based on use factors 118 that may be determined for each condition 106.

Use factor 118 may be a measure, value, or calculation that weighs the anticipated benefit or gain (e.g., exclusiveness or reduction in the number of remaining records that meet the condition 106) from processing a condition 106 against the potential cost (e.g., time/CPU cycles). In an embodiment, the cost of a first condition 106 may be greater than a second condition 106 if the first condition 106 must be processed serially, while the second condition 106 may be processed in parallel. The use factors 118 across different conditions 106 may be compared and ordered such that the most useful conditions 106 are processed first. Doing so may speed up the processing (e.g., by reducing the cost by having fewer remaining records to process) of later processed conditions 106. In such an embodiment, the local conditions (e.g., of step 340) may be processed prior to classifying the various zone types (e.g., of step 320).

In step 350, database system returns the result set of records that satisfy the query. For example, database system 102 may return result set 110 to a user or system. In an embodiment, result set 110 may be displayed on a monitor, used in further processing, or may be an empty or null set if no records satisfy the query 104. Database system 104 may perform processing on multiple queries in parallel. In an embodiment, the result set may be used in subsequent query operations to produce a set of records that satisfies the query.

Figure 6:
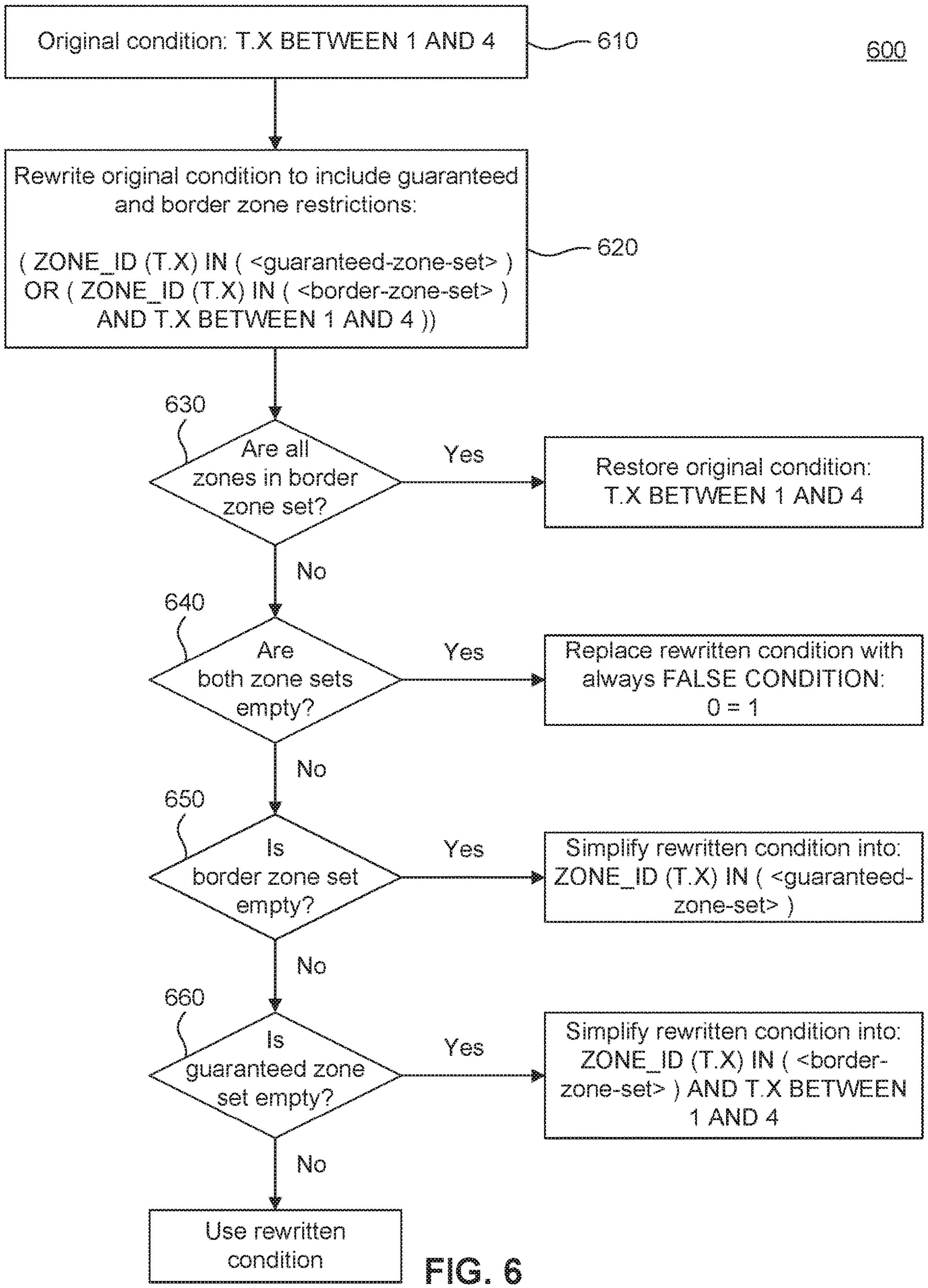
FIG. 6 is a flowchart illustrating an alternative process for accelerating queries with zone map enhancements, according to some embodiments.

FIG. 6 is a flowchart illustrating a process 600 for accelerating queries with zone map enhancements, according to another example embodiment. FIG. 6 shows an example of how steps 330 and 340 may be embodied as a transformation of the received condition into a complex disjunctive condition such that when evaluated or executed using a bitmap-based condition the evaluation may result in per-cell evaluation of the condition within the border zones, without performing a per-cell evaluation within the guaranteed zones. The process 600 also shows an example of how a complex condition can be simplified using condition simplification rules under various circumstances.

At step 610, a query including a condition is received. Database system 102 may receive a query and identify a clause, such as a WHERE clause indicating a condition. Based on the WHERE clause, database system 102 may identify the most efficient way (or a more efficient way relative to the manner in which the WHERE clause is provided) to identify the set of relevant rows in that table which satisfy all of the conditions. This evaluation may also consider any constraints imposed by the currently available resources, while minimizing any performance risks associated with any uncertainties in the metadata regarding the contents within the tables and columns involved.

In an embodiment, bitmaps may be used for the evaluation of a set of conditions over columns from a single table. Using a bitmap-based method, database system 102 may combine of the effects of multiple conditions, which are each using some index-based evaluation method, until finally a resultant set of rows relevant to a specified query has been identified, and can then be projected.

The condition determined from the query, in step 610 may be that the value of column T.X is between 1 and 4. As described above, database system 102 may classify or determine that zones 1, 3, and 3 are "qualified", leaving zones 5, 6, 7, and 8 as the "disqualified" zones.

At step 620, the determined condition may be written to include the determined border zones and/or restrictions. For example, the restriction down to rows whose column cell values are contained within the set of "qualified" zones can be expressed via the inference of an additional conjunctive local condition: ZONE_ID(T.X) IN (1, 2, 3, 4).

The form of this zone restriction condition may vary in different embodiments. It must simply be able to accept one or more direct zone identifiers (i.e. a list of zone numbers), and it must produce a result bitmap that identifies the rows whose column cell values reside within that set of zones. An optimizer (of database system 102) may construct this or another zone restriction condition in the required form, and then it can use its usual methods to reorder or otherwise reorganize the full set of local conditions in a manner so as to minimize the total estimated evaluation costs for that set of conditions.

In step 630, database system 102 may determine whether all the data zones are border zones. If yes, then the original condition may be maintained, as each row may be analyzed to determine which rows satisfy the conditions.

In step 640, if both the border and guaranteed zone sets are empty, then there are no rows that satisfy the condition, and an empty result set may be returned.

In step 650, if the border zone set is empty, then the rows of the guaranteed zones are the result set.

In step 660, if the guaranteed zone set is empty, then the rows of border zones may be analyzed to determine which rows satisfy the conditions. Once a result set is determined, in any of the steps of FIG. 6, processing may continue to perform a row-by-row analysis for any border zones (if necessary).

Database system 102 may classify the zones and determine that the BETWEEN condition has a "guaranteed" zone set of 111 and a "candidate" zone set of {2, 3, 4}. Therefore the BETWEEN conditions may be evaluated against those "candidate" zones but does not need to be evaluated against the "guaranteed" zones. Rather than merely inferring an additional conjunctive zone restriction condition the optimizer may rewrite the original column restriction condition into a more complex set of conditions, which then may be simplified in certain cases back into simpler conditions. To restrict the evaluation of the original zone mapped column restriction condition to the rows within the "candidate" zones, while also including the rows from the "guaranteed" zones, the most general form of this rewrite is to replace:

<original-zone-mapped-column-restriction> with: (<restriction-to-guaranteed-zones> OR (<restriction-to-candidate-zones> AND <original-zone-mapped-column-restriction>).)

Using the BETWEEN conjunct example and the form of the zone restriction condition as shown above, the optimizer can rewrite: T.X BETWEEN 1 AND 4 into: (ZONE_ID (T.X) IN (1) OR (ZONE_ID(T.X) IN (2, 3, 4) AND T.X BETWEEN 1 AND 4)).

In an embodiment, once this generalized inference has been applied, there are three special cases possible. If either zone restriction condition has an empty set of zones, then that zone restriction can conceptually be replace by an always false condition and the resulting expression can then be simplified using the usual rules of database condition simplification.

If the "guaranteed" zone set is empty and the "candidate" or border zone set is also empty, then the rewrite can be simplified to any local condition which yields the empty set of rows, for example the condition "T.X !=T.X".

If the "guaranteed" zone set is empty while the "candidate" zone set is not empty, then the rewrite can be simplified into: (<restriction-to-candidate-zones> AND <original-zone-mapped-column-restriction>)). If the "guaranteed" zone set is not empty while the "candidate" zone set is empty, then the rewrite can be simplified into: <restriction-to-guaranteed-zones>

In an embodiment, the whole set of local conditions may be rewritten as:

```
T.CUSTOMER_ID=1634679
AND (ZONE_ID(T.X) IN (1)
OR (ZONE_ID(T.X) IN (2, 3, 4)
  AND T.X BETWEEN 1 AND 4))
AND T.STATUS='RETURNED'
```

Note the example described, the inference has replaced the original conjunctive zone mapped column BETWEEN condition with a disjunctive condition that combines the "guaranteed" zone restriction plus the original BETWEEN condition which has been limited via conjunction to the "candidate" zones.

Assuming that the database has some mechanism to either store a bitmap per zone or to efficiently generate a bitmap given a single zone identifier or a set of zone identifiers, then this zone restriction condition may be very efficient. But no matter how efficient it is, on a cost basis there might be times when minimizing the cost of the whole set of conditions would require that some other condition be evaluated first. Having the zone restriction expressed as just another condition thereby allows it to be reordered by the optimizer among the set of all other conditions so as to minimize the cost of evaluating the whole set of local conditions. Additionally, since the inference of the ZONE_ID condition could itself take a non-trivial amount of time, the optimizer's decision to apply this inference should ideally be decided based on the comparing the estimated costs versus the estimated benefits.

For example, in the condition set above, if the T.CUSTOMER_ID condition is satisfied by 100 million rows while each zone has 1 million rows, then evaluating the T.CUSTOMER_ID condition after the ZONE_ID condition would likely be more efficient.

However, if the T.CUSTOMER_ID condition is satisfied by only 100 rows and we have a good index to identify those 100 rows, while each zone has 1 million rows, then the presence of that highly selective and efficient T.CUSTOMER_ID condition makes it likely that inferring any zone restriction condition would make the total query less efficient, and so it should be avoided.

Figure 7:
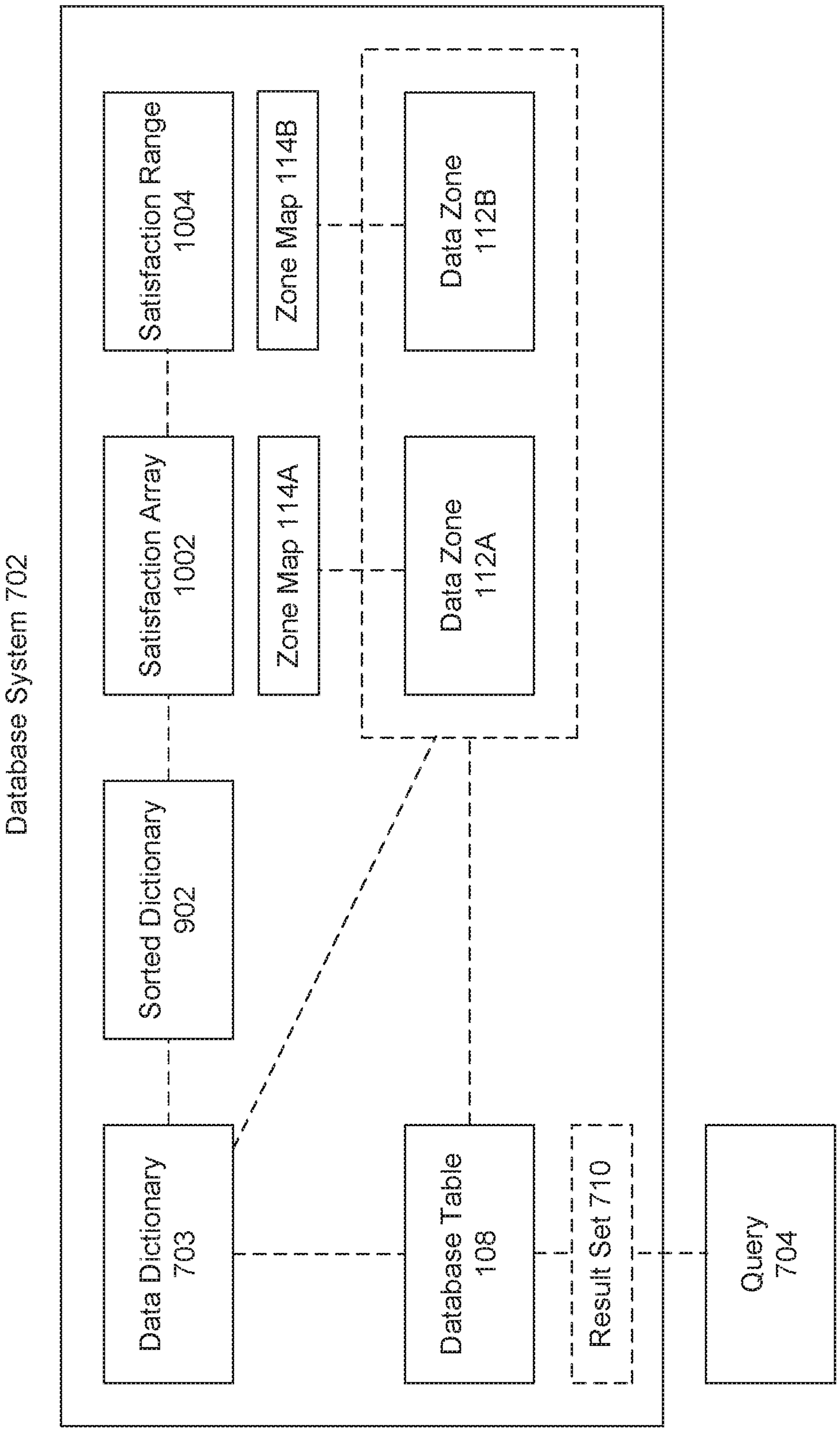
FIG. 7 is a block diagram of a database system that accelerates queries including complex conditions with zone map enhancements, according to some embodiments.

FIG. 7 is a block diagram of a database system 702 that accelerates queries including complex conditions with zone map enhancements, according to an example embodiment. In an embodiment, database system 702 may track, store, organize, retrieve, or maintain which the unique values are present in a particular column or database table 108, in a data dictionary 703.

Data dictionary 703 may track which values are located in which data zones 112A, 112B. A data zone 112 may include a grouped subset of the values from a particular column from database table 108. As described in greater detail below, database system 702 may use data dictionary 703 in combination with zone maps 114. As described above, a zone map 114 may include metadata about the values of a particular data zone 112, such as the min and max values in the particular data zone 112. In another embodiment, the distinct or unique values that are being used in a particular column or table 108 may be stored in or retrieved from a B-tree on the column (e.g., if they are not being maintained in a data dictionary 703).

Maintaining and mapping the unique values in data dictionary 703 to the various data zones 112 may enable database system 702 to accelerate the processing for a wide range of queries with any arbitrary conditions. In an embodiment, data dictionary 703 may enable processing of any conditions on a column of a database table 108, including but not limited to the range conditions (as described above).

Database system 702 may use the zone maps 112 and data dictionary 703 to process any single column local restriction condition from query 704. These local restrictions or query conditions may include, for example, functional expressions that are wrapped around a column, conditions that include multiple references to the same column, compound sets of conditions over the column, and inferred semi-join conditions.

Some example conditions of queries 704 that may be evaluated by database system 702 include Datepart(month, T.OrderDate)=12, RAND (T.X)<0.02, Coalesce(Abs(T.X), 1)>0, and 3+T.X+(2*Power(T.X, 2))+ Power(T.X, 3)=0.

It may require greater processing and computing resources to generate and/or maintain a data dictionary 703 (relative to not maintain a data dictionary), however depending on the nature of the conditions of the queries 704 being received, using the data dictionary 703 may result in processing and resource savings when being used with complex conditions in queries.

As used herein, the term complex condition may be used to describe any query condition that is not a simple range condition. The processing of range condition queries is described above with respect to the FIG. 1.

However, database system 702 may also process range conditions as described above with respect to database system 102 (FIG. 1). The processing of such range conditions 106 may follow a similar process described above, and do include or require the maintenance of data dictionary 703.

A data zone 112A, 112B may include any subset of values from a particular column of table 108 for which there is a mapping (e.g., mapping 115 from FIG. 1), algorithm, or other procedure or technique may which to identify which unique values of data dictionary 703 are stored in which zones (e.g., table subsets). Data zones 112 may or may not include sequential or contiguous records from a database table.

In an embodiment, each column may be separated into or have its own unique mapping (e.g., mapping 115) to its own unique data zones 112 in a column-oriented database. For example, the value from record 3, col 2 of database table 108 may be included in data zone 2 for column 2. However, the value for the same record 3, but col 3 may be included in data zone 12 for column 3. The data zones 112 for different columns of the same database table 108 may be accessed and mapped independently of one another.

Regardless of how zone boundaries are selected for a particular column, or how zone mapping is performed, database system 702 may maintain a mapping to identify which rows for the column belong to which disjoint table subset or data zone 112 corresponding to the column.

If the set of all the unique values of a column are known from a data dictionary 703 or other data structure, then any condition of a query 704 can be evaluated in a more efficient manner using zone map enhancements 114 as described herein. For example, using the mapping of unique values of data dictionary 703 to the various data zones 112A, 112B, each data zone 112 may be identified as qualified or disqualified (and in some embodiments guaranteed), as described above.

When a zone 112 is identified as either disqualified or guaranteed, then processing the various values in those zones 112 may be skipped in evaluating the condition(s) of query 704 because it is already known that none of the values of the zone satisfy the query 704 in disqualified zones or that all of the values of the zone satisfy the query in guaranteed zones. As a result, the amount of processing required to determine the result of a query may be greatly reduced.

A query 704 may be received on a database table 108. Query 704 may include one or more conditions that are focused on the values of a particular column of the database table 108. The single-column conditions may be evaluated, as described herein, using the data zones 112, zone maps 114, and data dictionary 703 to expedite processing and save computing resources.

FIG. 8 illustrates example zone maps 814 and a corresponding data zone structure 820 for values of a selected column from a database table 108, according to some embodiments.

The data structure 820 may include the values of an OrderDate column of a database table 108 that has been mapped or subdivided into eight data zones 812, which have been assigned their own unique zone identifiers. In an embodiment, the OrderDate column may indicate the date on which a product order was received.

The set of values 820 may illustrate how the values of the OrderDate column have been organized into various zones 812. However, in different embodiments, the same set of values may be differently organized into more or less zones than those indicated in the example of FIG. 8.

Zone map 814 may include a tracking of the min value 816A and max value 816B for each respective data zone as identified by zone identifier 812. For example, for zone 3, the minimum value may be 11/11 (November 11) and the maximum value may be 11/13 (November 13). Though illustrated as a single data structure, in another embodiment, the zone map 814 may include a plurality of zone maps 814 each include a corresponding zone ID 812, and both the minimum and maximum values 816A, 816B for a corresponding data zone.

In an embodiment, a query 704 may be received that requests those order dates that are either a Saturday or a Sunday. In an embodiment, the query 702 conditions may take the form:

DAYNAME(T.ORDERDATE)='Saturday' OR DAYNAME(T.ORDERDATE)='Sunday'

Because this query 704 is not simple range condition, database system 702 may utilize data dictionary 703 to accelerate the process of the query conditions. In an embodiment, if the unique set of values for a particular column are not known before the receipt of a query 704, the values may be retrieved or extracted from the column of database table 108 or from a B-Tree (if available) and stored in data dictionary 703 or another structure that maps the unique values to the corresponding data zones 112.

In an embodiment, query 704 may include other conditions on other columns that are not divided into zone maps. Database system 702, may still process those conditions and produce a result set 710 for query 704, however the other (non-zone mapped) conditions may be processed using techniques already known in the art.

FIG. 9 illustrates an example data dictionary 703 that has been sorted into a sorted dictionary 902, according to an embodiment. Sorted dictionary 902 may include the unique values of data dictionary 703 that have been sorted and assigned ordinals. The ordinal indicates the position of each value within the sorted set of values. In the example shown the values have been sorted from least to greatest, but in other embodiments, the order may be reversed.

Figure 10:
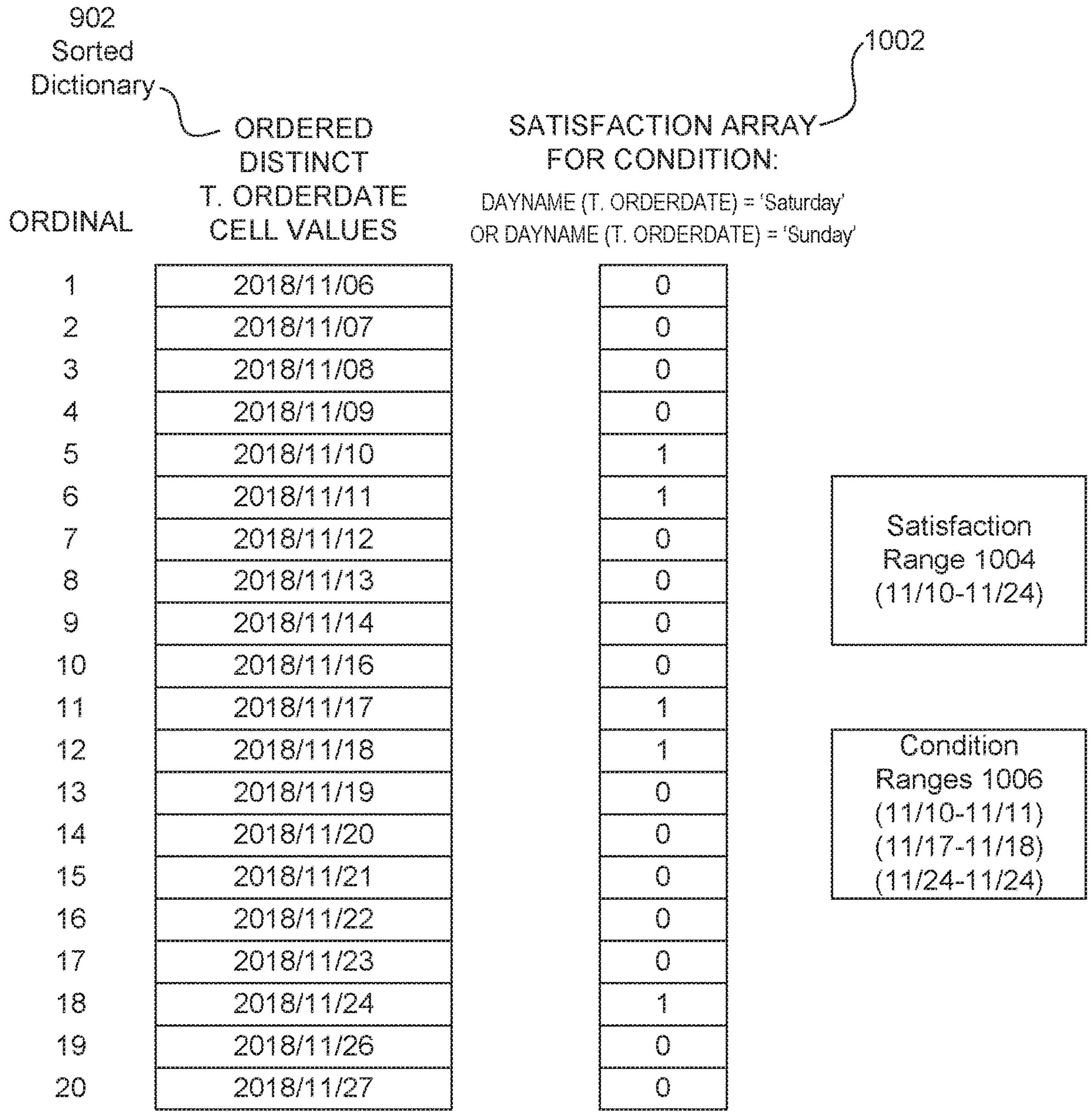
FIG. 10 illustrates an example satisfaction array, according to some embodiments.

FIG. 10 illustrates an example satisfaction array 1002, according to an embodiment. In an embodiment, the values from sorted dictionary 902 may be compared against one or more single-column-conditions of query 704 (on the column values) to produce a satisfaction array 1002.

Satisfaction array 1002 may a bit or binary array that indicates which of the unique values of the column satisfy the condition(s) of query 704. For example, the 1 bit may indicate that the corresponding date is either a Saturday or Sunday, while a 0 bit indicates that the corresponding date is a weekday (e.g., not a Saturday or Sunday). Satisfaction array 1002 may be synchronized or aligned with sorted dictionary 902, such that each bit of array 1002 maps to a corresponding value and/or ordinal of sorted dictionary 902. Sorted dictionary 902 and satisfaction array 1002 may be stored in a single or multiple different data structures.

In an embodiment, to process the condition of query 702, database system 702 may identify the smallest value that satisfied or satisfies the condition of the query 704 that was evaluated. For example, using satisfaction array 1002, the first '1' (e.g., non-0) Value may correspond to the smallest value that satisfied the Saturday/Sunday condition of query 702. In the example satisfaction array 1002, the smallest value that satisfies the condition is 11/10.

Database system 702 may then identify the largest value that satisfies the condition. For example, beginning from the last value and working backwards, the first 1 value may correspond to the largest value that satisfies the Saturday/Sunday condition of query 704. In the example shown, the largest value is 11/24. As such, database system 702 may generate or identify the satisfaction range 1004 for query 704 as being 11/10-11/24.

Satisfaction range 1004 may be a range of values that encompass all the possible values that may satisfy the evaluated condition(s) of query 704. For example, any unique values of the OrderDate column which are not within the satisfaction range 1004 are already known not to satisfy query 704 and do not need to be evaluated. Thus any zones which only includes these outside of the satisfaction range 1004 values can be identified as being disqualified and skipped, thus saving processing resources.

Database system 702 may compare satisfaction range 1004 to the zone map 814 (of FIG. 8) to determine which zones are qualified or disqualified. For example, database system 702 may identify those zones that include values that fall within the identified satisfaction range 1004.

Based on the comparison, of the satisfaction range 1004 to the minimax values 816 of zone map 814, it may be determined that zone 1 is disqualified (the min/max do not overlap with range 707), and the rest of the zones are qualified. In this example, the processing resources that would have otherwise been required to evaluate of the values of zone 1 are saved and may be allocated to other processes instead. This process may result in a constant or predictable cost in evaluating zones, and improves processing by skipping the processing of the identified disqualified zone(s).

In another embodiment, as illustrated in FIG. 10, database system 702 may identify a set of condition ranges 1006 that satisfy the condition. For example, rather than simply identifying a single satisfaction range 1004, database system 702 may identify a set of multiple satisfaction ranges, grouped together as condition ranges 1006. Then for the various zones of zone map 814, database system 702 may determine whether any of these condition ranges 1006 intersects a particular zone's range.

The condition ranges 1006 that satisfy the query 702 conditions on the column may be 11/10-11/11, 11/17-11/18, and 11/24 (all of which are indicated by is in satisfaction array 1002). When the condition ranges 1006 are compared against zone map 814, the first condition range intersects with zones 2 and 3, the second condition range intersects with zone 5, and the third condition range intersects with zones 7 and 8. As a result, the set of qualified zones from zone map 814 may be determined to {2, 3, 5, 7, 8} and the set of disqualified zones may be determined as being {1, 4, 6}.

Using this condition ranges 1006 approach, more disqualified zones may be identified relative to satisfaction range 1004. As a result, the processing and computing resources and time that would otherwise be necessary to process all the values of the disqualified zones 1, 4, and 6 are saved.

In another embodiment, the ordinals of sorted dictionary 902 may be used in evaluating the zones. For example, the zones of zone map 814 may be evaluated to determine the ordinal (from the sorted dictionary 902) corresponding to both the min value 816A and the max value 816B for the zone. Then, the query condition may be evaluated against the values in the sorted dictionary 902 between the lower and upper ordinals (for that zone).

If none of the values satisfy the condition, then the zone is disqualified (and does not need to be further evaluated). If a subset of the values satisfy the condition then the zone is qualified, and if all of the values satisfy the condition, then the zone is guaranteed (and also does not need to be further evaluated).

For example, from zone map 814, zone 2 includes a lower value of 11/8 and upper value of 11/10, which from sorted dictionary 902 correspond to ordinals 3 and 5 respectively. So then each of the values corresponding to the ordinals 3-5 may be evaluated against the query condition (whether the day is a Saturday or Sunday). It may be determined that 11/10 satisfies the condition, and thus zone 2 is a qualified zone. This process may be repeated for each of the zones from zone map 814.

In another embodiment, satisfaction array 1002 may be used in combination with ordinals for query evaluation. For example, for the zones 812 from zone map 814, database system 702 may identify the min value for the zone, and identify the ordinal corresponding to the min value (from sorted dictionary 902). Database system 702 may then, from satisfaction array 1002, determine whether any value satisfies the condition. From this analysis, database system 702 may determine which zones are qualified, disqualified, and/or guaranteed.

For example, looking again at zone 2 from zone map 814, the min/max range is 11/8-11/10, which corresponds to ordinals 3-5 from sorted dictionary 902. Database system 702 may determine from satisfaction array that only ordinal 5 corresponds to a 1, so zone 2 is qualified.

In an embodiment, if a satisfaction array 1002 does not exist or has not been created, then database system 702 may create a new satisfaction array for the values that are evaluated (thus avoiding performing duplicate value evaluations). For example, the result of the evaluations for each of the values corresponding to ordinals 3-5 (for zone 2) whether or not the values satisfy the query condition may be tracked. Then, if any of those values (corresponding to ordinals 3-5) are included in a subsequently evaluated zone, the query condition does not need to be re-evaluated, thus saving processing resources.

FIG. 11 illustrates a cumulative satisfaction array 1102 for processing queries, according to some example embodiments.

As described above, for the zones 812 of zone map 814, the min value 816A may be identified for a particular zone. The ordinal for that min value 816A may be determined from sorted dictionary 902. Then the max value 816B and corresponding ordinal from sorted dictionary 902 may also be identified. For example, for zone 2, the min value 11/08 may correspond to ordinal 3, and the max value 11/10 may correspond to ordinal 5.

In an embodiment, database system 702 may generate a cumulative satisfaction array 1102. For example, database system 702 may convert satisfaction array 1002 into a cumulative satisfaction array 1102. Cumulative satisfaction array 1102 may store a count of the values that have satisfied the condition from the first value to the current value. By doing this, database system 702 may eliminate the need to examine each element of the satisfaction array 1002 between the lower and upper ordinal values—thus saving processing resources.

Instead, using cumulative satisfaction array 1102 the count value of the ordinal below the lower ordinal may subtracted from the count value of the upper ordinal. If the difference is 0, then the zone is disqualified. If the difference is 1 or more, then the zone is qualified. As illustrated, the count in the cumulative satisfaction array 1102 may begin at 0.

For example, as described above, the ordinals for the min/max values of zone 2 correspond to 3 and 5 in sorted dictionary 902. From cumulative satisfaction array 1102, the count for the ordinal below the min ordinal (3), (e.g., ordinal 2) is 0. Database system 702 may further determine that the count corresponding to the max ordinal (5) is 1. Because 1 minus 0 is greater than 0, zone 2 may be determined as being qualified.

Figure 12:
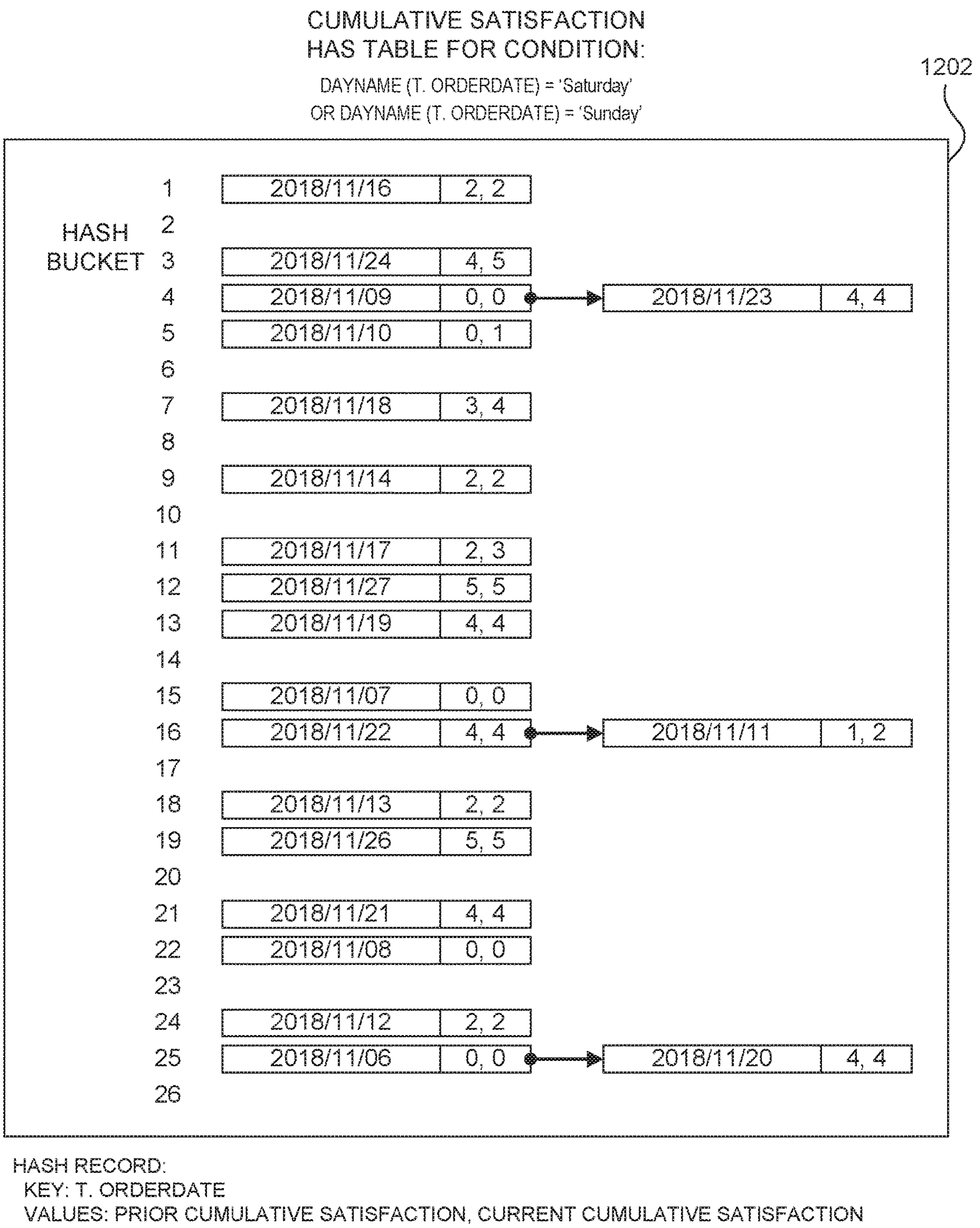
FIG. 12 illustrates a hash table for processing queries, according to some example embodiments.

FIG. 12 illustrates a hash table 1202 for processing queries, according to some example embodiments.

In an embodiment, a hash table 1202 may be generated and used to perform more efficient searching (relative to using a search tree or table lookup structure), particularly as the number of unique values in a particular column of table 108 grows. For example, for a million or unique values, hash table 1202 may reduce the overall processing resources and improve system efficiency.

Hash table 1202 may be a data structure that implements an associative array abstract data type, and that maps keys to values. In an embodiment, hash table 1202 may be generated by taking the distinct or unique values from sorted dictionary 902 in order.

The hash function may compute an index into an array of buckets or slots, from which a desired value can be found. Ideally, a hash function assigns each key to a unique bucket, but in reality, there may be hash collisions caused by a hash function generating the same index for multiple different keys. As illustrated in the example hash table 1202, there are some key values that the hash function produced overlapping buckets or hash collisions (4, 16, 25).

The hash table 1202 may use the unique order date values as keys, and also include values for the cumulative satisfaction count for the current ordinal and the prior cumulative satisfaction count for the previous ordinal (as determined from cumulative satisfaction array 1102). In another embodiment, instead of storing the prior cumulative satisfaction count, the hash table 1202 may store the current value's satisfaction value (e.g., from satisfaction array 1002).

In an embodiment, for the zones 812 of zone map 814, the min value 816A for a zone may be identified. For the identified min value 816A, the prior cumulative satisfaction count may be identified (e.g., for the ordinal prior to the min value ordinal). For example, zone 2 has min value of 11/8 which has a lower satisfaction count of 0.

Then, the current cumulative satisfaction count corresponding to the max value 816B ordinal may be identified. For example, zone 2 has a max value of 11/12 which has an upper satisfaction count of 1.

The lowest satisfaction count may be subtracted from the upper satisfaction count to determine whether the value is 0 (disqualified) or greater than 0 (qualified). For example, the difference of 1–0 is greater than 0 which means zone 2 is qualified. Applying this method to each of the zones of FIG. 8 will result in qualified zones {2, 3, 5, 7, 8} and disqualified zones {1, 4, 6}.

In different embodiments, zone maps 814 may either maintained after each new transaction or update is performed on database table 108, or may be allowed to become stale (e.g., only updated after a threshold number of transactions have been executed or time has passed). Allowing a zone map 814 to become stale may preserve some processing resources that would otherwise be required to constantly update the min/max zone values 816, however at the potential cost accuracy (e.g., stale or outdated min/max values 816).

In an embodiment, to improve this tradeoff between processing resources and accuracy, database system 702 may track to the values of a particular zone to ensure that min and max values are included at least once during stale periods (e.g., between updates). For example, zone 5 includes a min zone value of 11/16 which appears twice in the zone, and a max zone value of 11/18 that appears once. Database system 702 may update the min/max values if/when the 11/18 value is modified and no longer appears in the zone, or if both the min values of 11/16 are deleted/modified.

Figure 13:
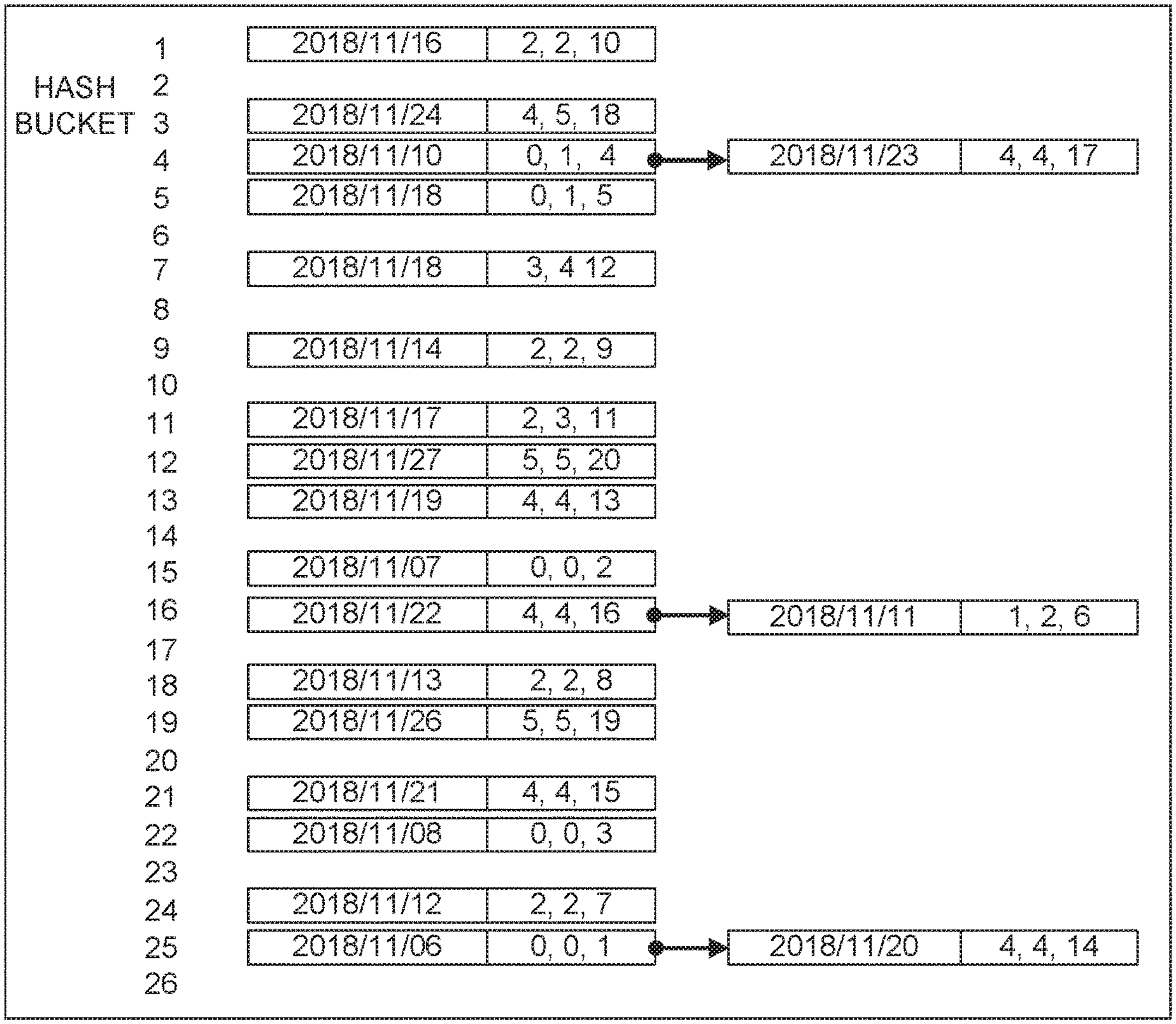
FIG. 13 illustrates a hash table for processing queries, according to some example embodiments.

FIG. 13 illustrates a hash table 1302 for processing queries, according to some example embodiments.

In an embodiment, database system 702 may use hash table 1302 to also identify guaranteed zones. In the example of hash table of 1302, the corresponding ordinal (e.g., from sorted dictionary 902) for the key values indicated are included in the table.

For example, for zone 2, the min value of 11/8 has a cumulative satisfaction count of 0 and a lower ordinal of 3. The max value for zone 2 is 11/10 which has a cumulative satisfaction count of 1 and upper ordinal of 5. The difference between the counts is greater than zero, thus zone 2 is qualified. The difference between the upper ordinal minus the lower ordinal plus 1 is (5–3=2+1=3). Because the count difference does not equal the ordinal difference plus 1, the zone is not guaranteed. If the count difference was 3, zone 2 would be guaranteed.

Figure 14:
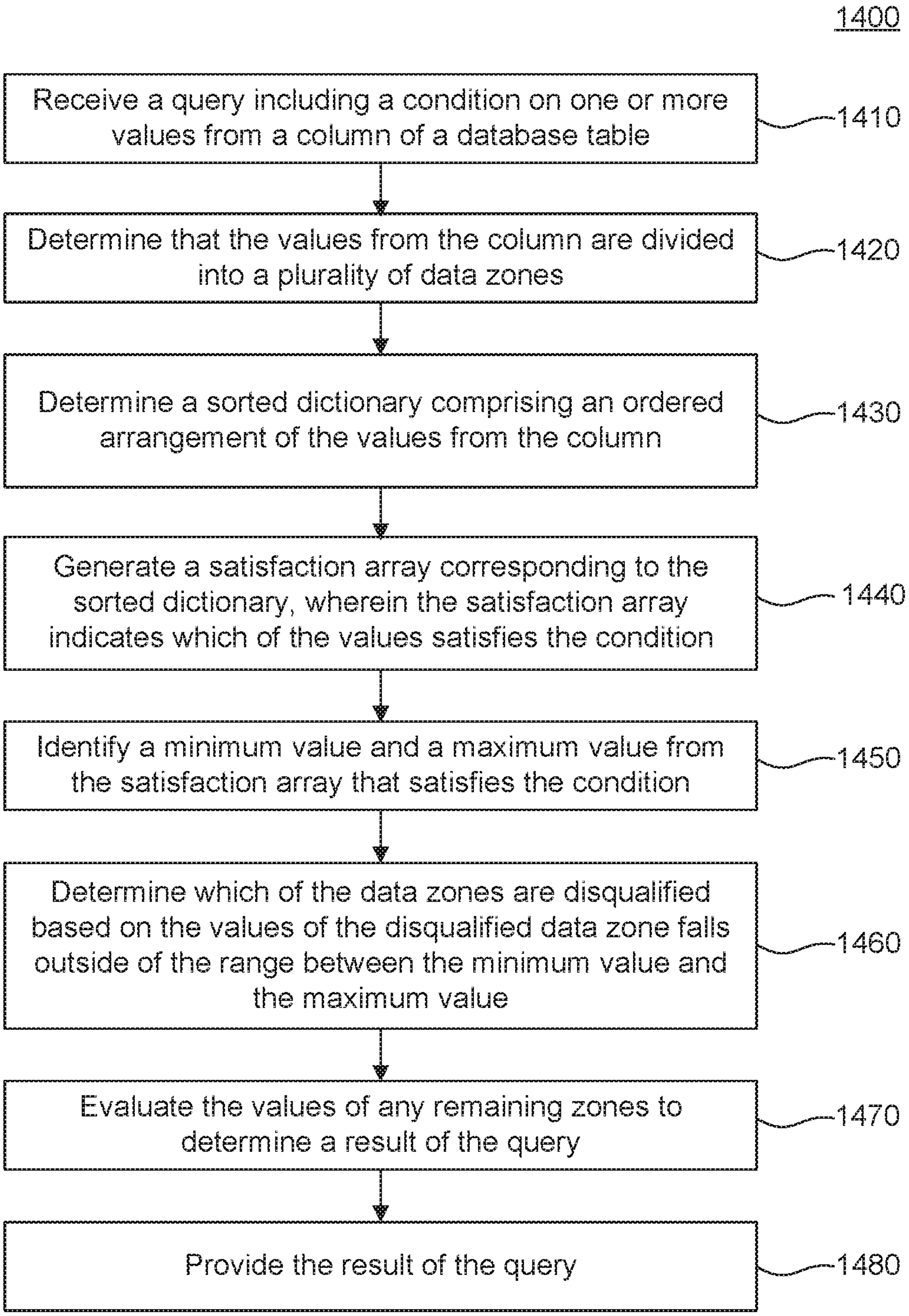
FIG. 14 is a flowchart illustrating a process for accelerating queries with zone map enhancements, according to some embodiments.

FIG. 14 is a flowchart illustrating a process for accelerating queries with zone map enhancements, according to an example embodiment. Method 1400 can be performed by processing logic that can comprise hardware (e.g., circuitry, dedicated logic, programmable logic, microcode, etc.), software (e.g., instructions executing on a processing device), or a combination thereof.

In step 1410, a query is received, the query including a condition on one or more values from a column of a database table. For example, FIG. 7 illustrates database system 702 receiving query 704. As described above, the query 704 may include a condition evaluating which order dates correspond to a weekend value, for values of an order date column of database table 108.

In step 1420, it is determined that the values from the column are divided into a plurality of data zones. For example, database system 702 may divide or determine that the values of an order date column are divided into various data zones as illustrated in set 820 of FIG. 8.

In step 1430, it is determined that a sorted dictionary comprising an ordered arrangement of the values from the column. For example, a sorted dictionary of the values from the order date column, from least to greatest, is illustrated. In an embodiment, each value may be assigned a unique identifier or ordinal, corresponding to its position in the sorted dictionary 902.

In step 1440, a satisfaction array corresponding to the sorted dictionary is generated, wherein the satisfaction array indicates which of the values satisfies the condition. For example, FIG. 10 illustrates a satisfaction array 1002 that indicates which values satisfy the condition of query 702.

In step 1450, a minimum value and a maximum value are identified from the satisfaction array that satisfies the condition. For example, as illustrated in FIG. 10, the minimum value and maximum values (as indicated by the 1 values) are 11/10 and 11/24 (ordinals 5 and 18, respectively).

In step 1460, which of the data zones are disqualified based on the values of the disqualified data zone falls outside of the range between the minimum value and the maximum value. For example, from zone map 814, it may be determine which data zones fall outside of the range of 11/10-11/24, which are disqualified zones. In the example, zone 1 may be identified as being disqualified.

In step 1470, the values of any remaining zones are evaluated to determine a result of the query. For example, as illustrated in FIG. 8, database system 702 may evaluate the values of the remaining qualified zones (2-8) to determine which records or rows satisfy he query 702 and store this result in a result set 710.

In step 1480, the result of the query is provided. For example, database system 702 may provide the result set 710 in response to query 704. The result set 710 may be displayed on a computing device, transmitted to another system, or otherwise stored or provided to a requesting user device or system.

Figure 4:
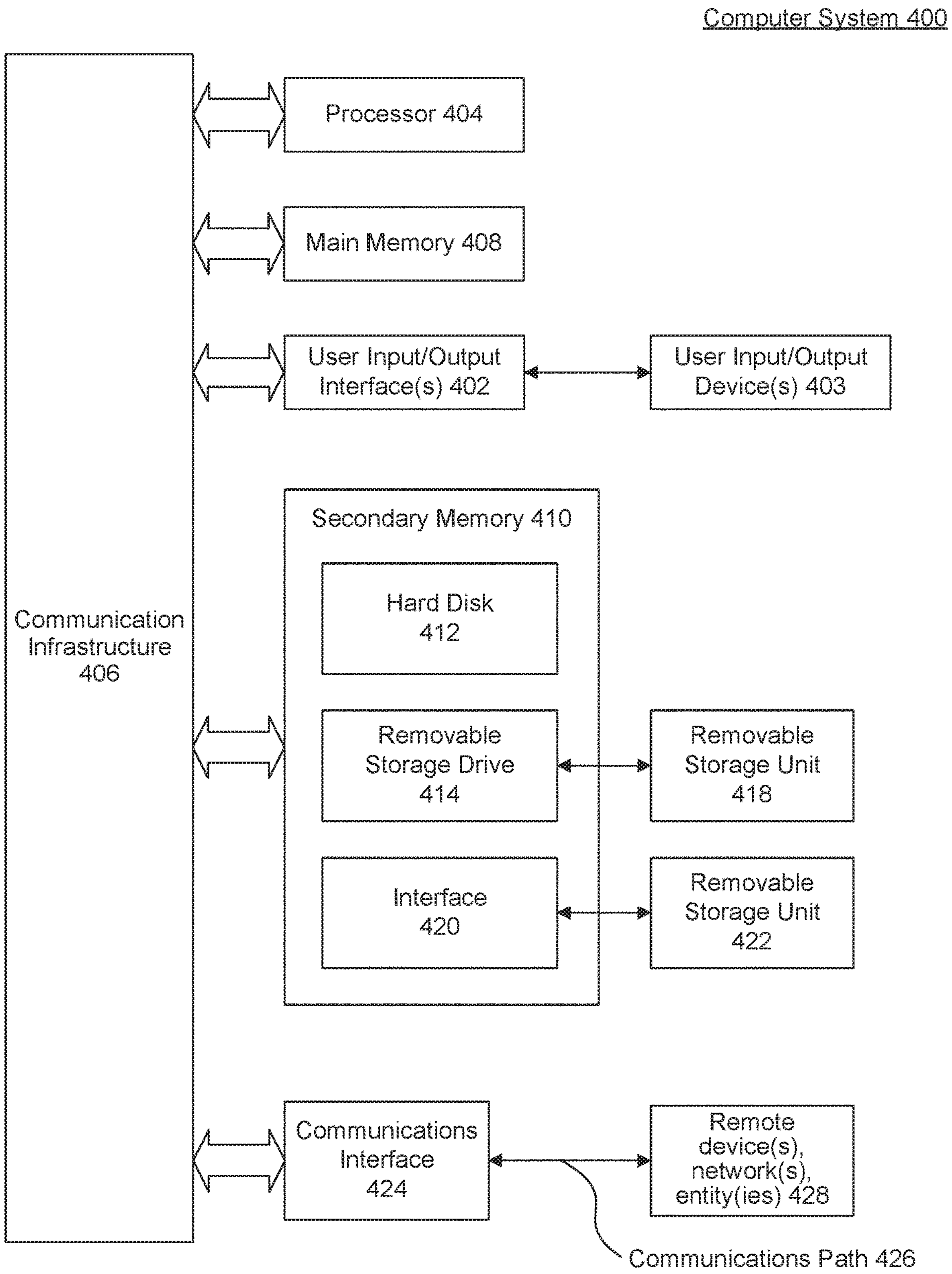
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:

receiving a query including a condition on one or more values from a column of a database table;

determining that the values from the column are divided into a plurality of data zones;

determining a sorted dictionary comprising an ordered arrangement of the values from the column, wherein an ordinal is assigned to each value of the sorted dictionary, and wherein the values of the sorted dictionary are arranged from least to greatest;

generating a satisfaction array corresponding to the sorted dictionary, wherein the satisfaction array indicates which of the values satisfies the condition;

identifying a minimum value and a maximum value from the satisfaction array that satisfies the condition;

determining which of the data zones are disqualified based on the values of the disqualified data zone falls outside of the range between the minimum value and the maximum value;

identifying ordinals that correspond to the minimum value and the maximum values for each zone;

determining from the satisfaction array, one or more qualified zones based on values in the satisfaction array between the ordinals indicate the condition is satisfied by the corresponding value in the satisfaction array;

evaluating the values of the one or more qualified zones to determine a result of the query; and providing the result of the query.

2. The method of claim 1, wherein the identifying comprises:

identifying a plurality of ranges from the satisfaction array that satisfy the condition; and determining which of the data zones are disqualified based on the values of the disqualified data zone falling outside the range between the minimum value and maximum value of each of the plurality of ranges.

3. The method of claim 1, wherein the satisfaction array comprises a binary value array.

4. The method of claim 1, wherein the identifying comprises:

identifying ordinals that correspond to the minimum value and the maximum values for each zone;

generating a cumulative satisfaction array that includes a count of how many values satisfy the condition;

determining from the cumulative satisfaction array one or more qualified zones and one or more disqualified zones based on the count.

5. The method of claim 4, wherein the cumulative satisfaction array, the values and the ordinals are stored in a hash table.

6. A system, comprising:

a non-transitory memory;

at least one processor coupled to the non-transitory memory and configured to:

receive a query including a condition on one or more values from a column of a database table;

determine that the values from the column are divided into a plurality of data zones;

determine a sorted dictionary comprising an ordered arrangement of the values from the column, wherein an ordinal is assigned to each value of the sorted dictionary, and wherein the values of the sorted dictionary are arranged from least to greatest;

generate a satisfaction array corresponding to the sorted dictionary, wherein the satisfaction array indicates which of the values satisfies the condition;

identify a minimum value and a maximum value from the satisfaction array that satisfies the condition;

determine which of the data zones are disqualified based on the values of the disqualified data zone falls outside of the range between the minimum value and the maximum value;

identify ordinals that correspond to the minimum value and the maximum values for each zone;

determine from the satisfaction array, one or more qualified zones based on values in the satisfaction array between the ordinals indicate the condition is satisfied by the corresponding value in the satisfaction array;

evaluate the values of the one or more qualified zones to determine a result of the query; and provide the result of the query.

7. The system of claim 6, wherein the one or more processors that identify are configured to:

identify a plurality of ranges from the satisfaction array that satisfy the condition; and determine which of the data zones are disqualified based on the values of the disqualified data zone falling outside the range between the minimum value and maximum value of each of the plurality of ranges.

8. The system of claim 6, wherein the satisfaction array comprises a binary value array.

9. The system of claim 6, wherein the one or more processors that identify are configured to:

identify ordinals that correspond to the minimum value and the maximum values for each zone;

generate a cumulative satisfaction array that includes a count of how many values satisfy the condition;

determine from the cumulative satisfaction array one or more qualified zones and one or more disqualified zones based on the count.

10. The system of claim 9, wherein the cumulative satisfaction array, the values and the ordinals are stored in a hash table.

11. A tangible computer-readable device having instructions stored thereon that, when executed by at least one computing device, causes the at least one computing device to perform operations comprising:

receiving a query including a condition on one or more values from a column of a database table;

determining that the values from the column are divided into a plurality of data zones;

determining a sorted dictionary comprising an ordered arrangement of the values from the column, wherein an ordinal is assigned to each value of the sorted dictionary, and wherein the values of the sorted dictionary are arranged from least to greatest;

generating a satisfaction array corresponding to the sorted dictionary, wherein the satisfaction array indicates which of the values satisfies the condition;

identifying a minimum value and a maximum value from the satisfaction array that satisfies the condition;

determining which of the data zones are disqualified based on the values of the disqualified data zone falls outside of the range between the minimum value and the maximum value;

identifying ordinals that correspond to the minimum value and the maximum values for each zone;

generating a cumulative satisfaction array that includes a count of how many values satisfy the condition;

determining from the cumulative satisfaction array one or more qualified zones and one or more disqualified zones based on the count;

evaluating the values of the one or more qualified zones to determine a result of the query; and providing the result of the query.

12. The device of claim 11, wherein the identifying comprises:

identifying a plurality of ranges from the satisfaction array that satisfy the condition; and determining which of the data zones are disqualified based on the values of the disqualified data zone falling outside the range between the minimum value and maximum value of each of the plurality of ranges.

13. The device of claim 11, wherein the satisfaction array comprises a binary value array.

14. The device of claim 11, wherein the identifying comprises:

identifying ordinals that correspond to the minimum value and the maximum values for each zone; and determining from the satisfaction array, one or more qualified zones based on values in the satisfaction array between the ordinals indicate the condition is satisfied by the corresponding value in the satisfaction array.

* * * * *